United States Patent
Broussard et al.

(10) Patent No.: US 11,725,778 B2
(45) Date of Patent: Aug. 15, 2023

(54) AUTOMATED MULTI-VALVE/POINT LUBE SYSTEM

(71) Applicant: DUALCO, Inc., Houston, TX (US)

(72) Inventors: Timothy J. Broussard, Houston, TX (US); D. L. Whitney Reed, Houston, TX (US); Brian K. Reed, Houston, TX (US)

(73) Assignee: DUALCO, INC., Houston, TX (US)

( * ) Notice: Subject to any disclaimer, the term of this patent is extended or adjusted under 35 U.S.C. 154(b) by 176 days.

(21) Appl. No.: 16/374,583

(22) Filed: Apr. 3, 2019

(65) Prior Publication Data

US 2019/0301672 A1 Oct. 3, 2019

Related U.S. Application Data

(60) Provisional application No. 62/652,123, filed on Apr. 3, 2018.

(51) Int. Cl.
*F16N 7/38* (2006.01)

(52) U.S. Cl.
CPC .......... *F16N 7/385* (2013.01); *F16N 2270/30* (2013.01)

(58) Field of Classification Search
CPC .............................. F16N 7/385; F16N 2270/30
See application file for complete search history.

(56) References Cited

U.S. PATENT DOCUMENTS

| | | | | |
|---|---|---|---|---|
| 4,205,708 A | * | 6/1980 | Burgbacher | D03J 1/003 139/1 R |
| 4,368,803 A | * | 1/1983 | Dombroski | B65G 45/08 184/15.3 |
| 5,285,871 A | * | 2/1994 | Sievenpiper | F16N 11/10 184/29 |
| 2004/0191081 A1 | * | 9/2004 | Schmidt | F16N 7/385 417/307 |
| 2009/0314581 A1 | * | 12/2009 | Whitney Reed | F16N 7/38 184/54 |
| 2010/0219020 A1 | * | 9/2010 | Knox | B65G 45/02 184/7.4 |
| 2012/0247876 A1 | * | 10/2012 | Kreutzkamper | F16N 29/02 184/26 |
| 2013/0277148 A1 | * | 10/2013 | Beck | F16N 29/02 184/6.4 |
| 2016/0290848 A1 | * | 10/2016 | Conley | F16N 31/00 |
| 2017/0113315 A1 | * | 4/2017 | Bangma | F16N 7/32 |
| 2017/0152992 A1 | * | 6/2017 | Karlsson | B04B 9/12 |
| 2018/0100619 A1 | * | 4/2018 | Divisi | F16N 29/00 |
| 2019/0301672 A1 | * | 10/2019 | Broussard | F16N 7/385 |
| 2020/0032956 A1 | * | 1/2020 | Reed | F16N 7/38 |

* cited by examiner

*Primary Examiner* — Michael A Riegelman
(74) *Attorney, Agent, or Firm* — Alexander B. Uber; Gray Reed

(57) ABSTRACT

System and method for automated multi-valve/point lubrication through use of regulated transfer of lubricant at predetermined time intervals. In some embodiments, a system control panel is used to toggle airflow into a lubricant pump to regulate lubricant transfer to a plurality of lubrication points.

20 Claims, 2 Drawing Sheets

AUTOMATED MULTI-VALVE/POINT LUBE SYSTEM

CITATION TO PRIOR APPLICATIONS

The present application is a non-provisional of and claims priority to U.S. Provisional Application Ser. No. 62/652,123, entitled "AUTOMATED MULTI-VALVE/POINT LUBE SYSTEM" and filed Apr. 3, 2018.

BACKGROUND OF THE INVENTION

1. Field of the Invention

The present invention is directed to systems and methods for providing automated multi-point/valve lubrication in industrial settings.

2. Description of the Prior Art

Traditional methods for valve lubrication involve manual control of grease flow to valves. This manual approach; however, can often result in improper lubrication that leads to valve/bearing failure requiring increased expenditures for maintenance and valve replacement.

In addition to these concerns, prior art methods also involve high levels of energy consumption, lubricant consumption, equipment downtime, operating expenses, and waste relative to the automated systems and methods of the present invention.

Furthermore, prior art methods are hampered by the practical considerations of time and available personnel as these constraints often render such methods ineffective at keeping up with the greasing requirements of larger multi-point/valve systems. Accordingly, industrial operations, utilizing these prior art methods, would have to be halted in order to ensure proper equipment maintenance. Additionally, reliance on manual lubrication also puts human operators at risk when attempting to access difficult-to-reach points or valves that may be located over or under machinery.

Some prior art approaches have utilized simple manifolds in an attempt to accomplish multi-valve lubrication, but these approaches have also been ineffective and wasteful as the flowing lubricant tends to follow the path of least resistance typically to valves having bad seals or leaks.

SUMMARY OF THE INVENTION

It is an object of the present invention to provide efficient multi-point/valve lubrication through use of an automated system that applies an adequate amount of lubricant over frequent intervals to each individual point/valve of a plurality of points/valves.

In certain embodiments, the plurality of points/valves comprises between 2 and 24 individual points/valves.

The automated lubrication system and methods of the present invention address the above-referenced problems, limitations, and unmet desires experienced with prior art approaches.

Specifically, by eliminating the need for manual application of lubricant and ensuring proper lubrication of all points/valves, the present invention improves equipment productivity, sustainability, reliability, and overall profitability. Furthermore, for the same reasons, maintenance costs (including that of stocking replacement parts), risks to personnel, unplanned downtime, wear on valves, waste, and labor costs are reduced by the present invention. Additionally, automated lubrication has been shown to be effective while utilizing 33% less lubricant than prior art manual lubrication.

The present invention may be configured for a variety of multi-point/valve systems including cementing units, gate valves, plug valves, other valve manifolds, hydraulic fracturing missile trailer valves, and other valves or multi-bearing/shaft systems. As will be appreciated by those skilled in the art, the present invention may also be configured for other point/valve systems not listed herein.

DETAILED DESCRIPTION OF THE INVENTION

This description, with reference to the figures, presents non-limiting examples of embodiments of the present invention.

Figure 1:
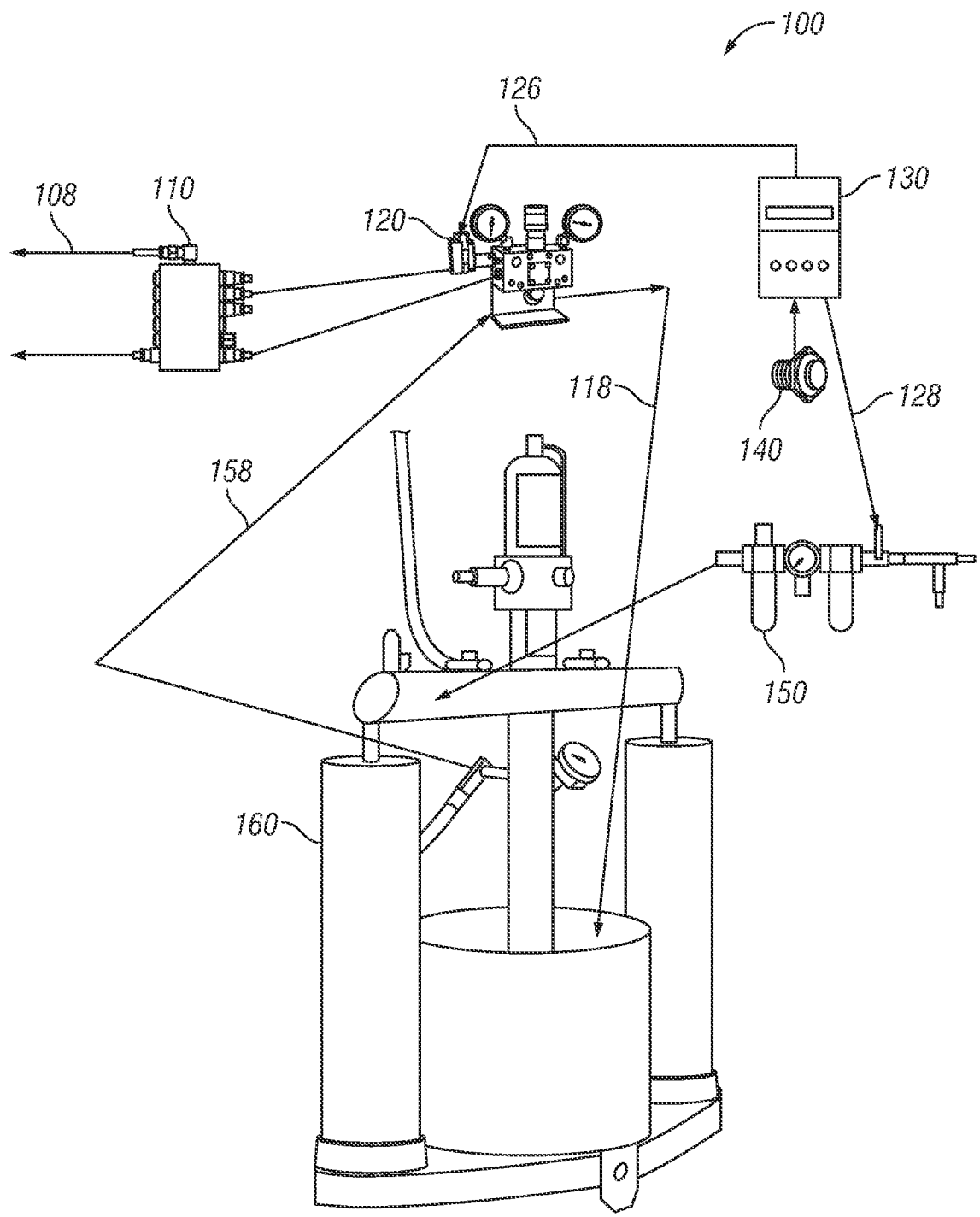
FIG. 1 illustrates the flow of operations within one embodiment of the present invention.

As depicted in FIG. 1, in one embodiment of the present invention, the automated lubrication system 100 features a system control panel 130 operably coupled to both a master control device 120 and an air supply unit 150 via signals 126 and 128 respectively. The master control device 120 and air supply unit 150 are coupled to a lubricant pump 160 to effectuate delivery of an amount of lubricant to at least one lubrication point of a plurality of lubrication points. Said system control panel 130 is configured to cause said amount of lubricant to be delivered at a predetermined time interval.

When a user wants to begin the lubrication process, the system control panel 130 is activated by an On/Off switch 140. When activated, the system control panel 130 causes a signal 128 to be transmitted to the air supply unit 150 via a solenoid which in turn causes air to flow into the lubricant pump 160. The lubricant pump 160 is coupled to the master control device 120 with a supply line 158 through which lubricant is transferred when air is flowing from the air supply unit 150.

Still referring to FIG. 1, system control panel 130 can be any similar multipurpose programmable controller. In this embodiment, master control device 120 is shown as a reversing valve acting essentially as a pump-stroke counter to assist in regulating lubricant transfer. Secondary control device 110 is depicted as a hydraulic valve capable of discharge quantity adjustment.

The master control device 120 is further coupled to at least one secondary control device 110. The secondary control device 110 is coupled to said at least one lubrication point of said plurality of lubrication points via a lubricant line 108. The master control device 120 and at least one secondary control device 110 are configured to deliver said amount of lubricant to said at least one lubrication point. Said master control device 120 and said secondary control device 110 may also be configured to deliver said amount of lubricant to each lubrication point of said plurality of lubrication points.

The master control device 120 may also include a relief outlet 118 through which lubricant in excess of said amount may be returned to the lubricant pump's 160 reservoir.

Additionally, the system control panel 130 may be low voltage requiring and be programmed with software that monitors and regulates the timing of lubricant delivery by causing the air supply unit 150 to begin or terminate air flow to the lubricant pump 160. In this manner, air flow may be limited to only that which is needed to effectuate the desired lubrication.

In other embodiments, the lubricant pump 160 utilizes a bucket container to store the lubricant.

In certain embodiments, the lubrication points are valve seats and the lubricant is grease. Grease is applied evenly on said valve seats to ensure better grease coverage.

In another embodiment, the plurality of lubrication points corresponds to an 11 dual/valve system wherein each lubrication point is a main plug valve. When activated, the system control panel 130 causes each main plug to be lubricated in 3 minutes.

In some embodiments, the system may be partially contained and secured in a locked metal cabinet to minimize risk of contamination or harm to personnel in the vicinity of the air supply unit 150 and lubricant pump 160.

Figure 2:
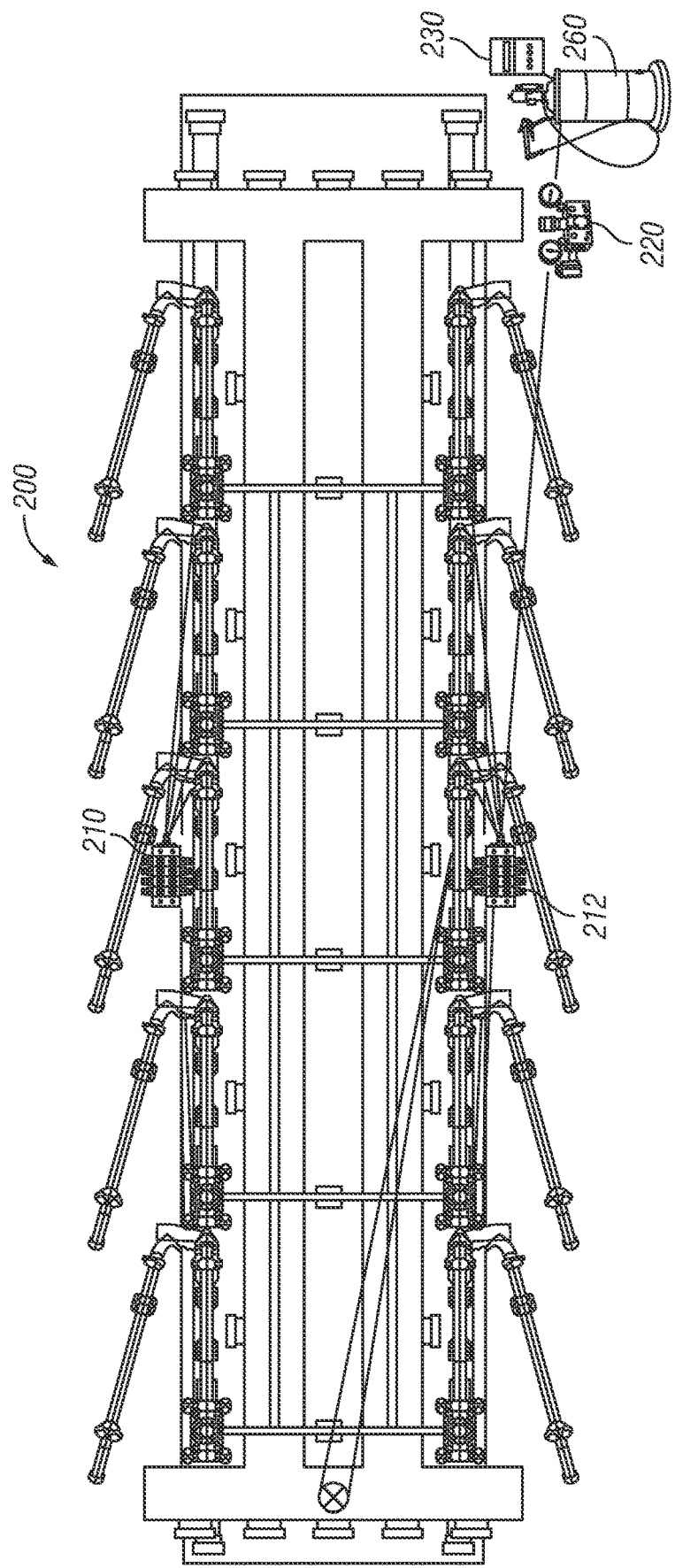
FIG. 2 depicts one embodiment of the present invention in which lubrication is provided through a 10- and a 12-point lube control device (secondary control device).

FIG. 2 depicts one embodiment of the automated lubrication system 200 in which lubrication is provided through a 10- and 12-point lubrication control device (210 and 212 respectively, each a secondary control device). The automated lubrication system 200 features a system control panel 230 coupled to a lubricant pump 260 to effectuate delivery of an amount of lubricant to at least one lubrication point of a plurality of lubrication points via a master control device 220. Pump 260 can be a 70:1 pump (5 gallons).

Although particular detailed embodiments of the system and method have been described herein, it should be understood that the invention is not restricted to the details of the preferred embodiment. Many changes in design, composition, and configuration are possible without departing from the spirit and scope of the instant invention.

What is claimed is:

1. An automated multi-point lubrication system comprising:
   a system control panel communicably coupled to an air supply unit;
   a master control device communicably coupled to said system control panel and configured to cause a target amount of lubricant to be transferred to a plurality of lubrication points by regulating said target amount of lubricant passing through, wherein said master control device is coupled to a secondary control device configured to transfer said target amount of lubricant to said plurality of lubrication points by regulating said target amount of lubricant passing through; and
   a lubricant pump, said lubricant pump being coupled to said air supply unit and to said master control device,
   wherein said system control panel is configured to cause the air supply unit to begin or terminate air flow to the lubricant pump,
   wherein said air flow causes said target amount of lubricant to be transferred from said lubricant pump to said master control device, and
   wherein said system control panel regulates said target amount of lubricant transferred to said plurality of lubrication points by monitoring and regulating the timing of said air flow.

2. The system of claim 1 wherein said air flow is limited to only that which is needed to cause said target amount of lubricant to be transferred to said plurality of lubrication points.

3. The system of claim 2 wherein said system control panel is further configured to regulate said air flow at a predetermined interval.

4. The system of claim 2 wherein said air flow causes said target amount of lubricant to be transferred from said lubricant pump to said master control device via a supply line.

5. The system of claim 1, wherein said system control panel, said air supply unit, said master control device, said secondary control device, and said lubricant pump are separate devices from each other.

6. The system of claim 1, wherein the secondary control device is a 10-point lubrication control device.

7. The system of claim 1, wherein the secondary control device is a 12-point lubrication control device.

8. The system of claim 1, wherein the plurality of lubrication points corresponds to an 11 dual/valve system wherein each lubrication point is a main plug valve.

9. The system of claim 1, wherein the lubrication points are valve seats.

10. The system of claim 9, wherein the lubricant is grease, and the master control device is configured to dispense the grease evenly over the valve seats.

11. The system of claim 10, wherein the system is partially enclosed within a metal cabinet.

12. An automated multi-point lubrication system comprising:
   a system control panel communicably coupled to an air supply unit;
   a reversing valve communicably coupled to said system control panel and configured to cause a target amount of lubricant to be transferred to a plurality of lubrication points by regulating said target amount of lubricant passing through the reversing valve, wherein said master control device is communicably coupled to said system control panel;
   a secondary control device coupled to said master control device configured to transfer said target amount of lubricant to said plurality of lubrication points by regulating said target amount of lubricant passing through the secondary control device; and
   a lubricant pump, said lubricant pump being coupled to said air supply unit and to said master control device,
   wherein said system control panel is configured to cause said air supply unit to begin air flow to said lubricant pump when said system control panel is activated,
   wherein said air flow causes said target amount of lubricant to be transferred from said lubricant pump to said master control device, and
   wherein said system control panel regulates said target amount of lubricant transferred to said plurality of lubrication points by monitoring and regulating the timing of said air flow.

13. The system of claim 12, wherein said system control panel, said air supply unit, said master control device, said secondary control device, and said lubricant pump are separate devices from each other.

14. The system of claim 12, wherein the plurality of lubrication points corresponds to an 11 dual/valve system wherein each lubrication point is a main plug valve.

15. The system of claim 12, wherein the lubrication points are valve seats.

16. The system of claim 15, wherein the lubricant is grease, and the master control device is configured to dispense the grease evenly over the valve seats.

17. The system of claim 16, wherein the system is partially enclosed within a metal cabinet.

18. An automated multi-point lubrication system comprising:
- a system control panel communicably coupled to an air supply unit;
- a reversing valve configured to cause a target amount of lubricant to be transferred to a plurality of lubrication points by regulating the target amount of lubricant passing through the reversing valve, wherein the reversing valve is communicably coupled to the system control panel, wherein the plurality of lubrication points corresponds to an 11 dual/valve system, wherein each lubrication point is a main plug;
- a secondary control device coupled to the reversing valve configured to transfer the target amount of lubricant to the plurality of lubrication points by regulating the target amount of lubricant passing through the secondary control device; and
- a lubricant pump, the lubricant pump being coupled to the air supply unit and to the master control device,
- wherein the system control panel is configured to cause the air supply unit to begin air flow to the lubricant pump when the system control panel is activated,
- wherein said system control panel regulates said target amount of lubricant transferred to said plurality of lubrication points by monitoring and regulating the timing of said air flow,
- wherein said target amount of lubricant is transferred from said lubricant pump to said master control device from said air flow, and
- wherein said air flow is limited to only that which is needed to cause said target amount of lubricant to be transferred to said plurality of lubrication points.

19. The system of claim 18, wherein the system control panel causes each main plug to be lubricated in 3 minutes.

20. The system of claim 19, wherein the secondary control device is a hydraulic valve capable of discharge quantity adjustment.

* * * * *